United States Patent
Liu et al.

(10) Patent No.: US 9,560,165 B2
(45) Date of Patent: Jan. 31, 2017

(54) BT OFFLINE DATA DOWNLOAD SYSTEM AND METHOD, AND COMPUTER STORAGE MEDIUM

(71) Applicant: Tencent Technology (Shenzhen) Company Limited, Shenzhen, Guangdong (CN)

(72) Inventors: Gang Liu, Shenzhen (CN); Chenyuan Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 307 days.

(21) Appl. No.: 14/154,934

(22) Filed: Jan. 14, 2014

(65) Prior Publication Data
US 2014/0129624 A1    May 8, 2014

Related U.S. Application Data

(63) Continuation of application No. PCT/CN2012/086770, filed on Dec. 17, 2012.

(30) Foreign Application Priority Data

Feb. 8, 2012 (CN) .......................... 2012 1 0027569

(51) Int. Cl.
H04L 29/08 (2006.01)
H04L 29/06 (2006.01)

(52) U.S. Cl.
CPC .............. *H04L 67/42* (2013.01); *H04L 67/06* (2013.01); *H04L 67/2861* (2013.01); *H04L 67/325* (2013.01)

(58) Field of Classification Search
CPC ......... H04L 67/06; H04L 67/42; H04L 67/325
See application file for complete search history.

(56) References Cited

U.S. PATENT DOCUMENTS 6,098,180 A * 8/2000 Kobata ................... H04L 29/06
                                                                714/18
2006/0224687 A1   10/2006 Popkin et al.
(Continued)

FOREIGN PATENT DOCUMENTS

CN    101277276 A    10/2008
CN    101873348 A    10/2010

OTHER PUBLICATIONS

International Search Report, dated Mar. 28, 2013, pp. 1-2, International Application No. PCT/CN2013/086770, The State Intellectual Property Office, the P.R. China.
(Continued)

*Primary Examiner* — Oanh Duong
(74) *Attorney, Agent, or Firm* — Brinks Gilson & Lione (57) ABSTRACT

A BT offline data download system and method, and a computer storage medium with instructions to perform BT offline data download are provided. The system may include an offline download task management server that may receive a download task. The system may also include an offline download scheduling server that may perform arrangement and combination processing on the download task. An offline download server may then download data according to the download task. The data may correspond to a subset of files after the arrangement and combination processing, and store the downloaded data in a storage server. A download client device may download, from the storage server, the downloaded data of the subset of files corresponding to the download task. The subset of files may be selected by a user to be obtained at the download client device.

17 Claims, 6 Drawing Sheets

(56) References Cited

U.S. PATENT DOCUMENTS

| | | | | |
|---|---|---|---|---|
| 2008/0114720 | A1* | 5/2008 | Smith | G06F 17/30578 |
| 2008/0127190 | A1* | 5/2008 | Shu | H04L 41/0803 718/102 |
| 2008/0244037 | A1* | 10/2008 | Okuda | H04N 7/17318 709/217 |
| 2009/0282077 | A1* | 11/2009 | Thomas | G06F 17/30038 |
| 2010/0008509 | A1* | 1/2010 | Matsushita | H04L 9/083 380/279 |
| 2010/0161829 | A1* | 6/2010 | Kumaran | G11B 27/10 709/233 |
| 2011/0060721 | A1* | 3/2011 | Chalouhi | H04L 67/104 707/622 |
| 2011/0225580 | A1* | 9/2011 | Nair | G06F 9/44505 717/178 |
| 2012/0084399 | A1* | 4/2012 | Scharber | H04L 67/34 709/219 |
| 2012/0233463 | A1* | 9/2012 | Holt | G06F 17/30575 713/168 |
| 2014/0040353 | A1* | 2/2014 | Sebastian | H04L 67/06 709/203 |
| 2014/0156687 | A1* | 6/2014 | Chen | G06F 17/30156 707/758 |
| 2016/0210307 | A1* | 7/2016 | Pittelko | G06F 11/1448 |

OTHER PUBLICATIONS

International Search Report, dated Mar. 28, 2013, pp. 1-2, International Application No. PCT/CN2012/086770, The State Intellectual Property Office, the P.R. China.

* cited by examiner

BT OFFLINE DATA DOWNLOAD SYSTEM AND METHOD, AND COMPUTER STORAGE MEDIUM

This application is a continuation application of PCT international application PCT/CN2012/086770, filed on Dec. 17, 2012 which claims the priority of Chinese Patent Application No. 201210027569.8, entitled "SYSTEM AND METHOD FOR DOWNLOADING BT OFFLINE DATA AND COMPUTER STORAGE MEDIUM", filed with the Chinese Patent Office on Feb. 8, 2012, both of which are incorporated herein by reference in their entirety.

FIELD

The present disclosure relates to the field of data download, and in particular to a system and method for the offline downloading of BitTorrent data and a computer storage medium.

BACKGROUND

Typically, in an offline download, a server of a downloader, instead of a client device, may download a file in response to a command from a user. If resources available for the file to be downloaded are scarce, the user may spend a long time to download the file via the client device, for example if download speed is low. By adopting the offline download, the server of the downloader is responsible for downloading the file, instead of the client device. In this case, the user may suspend, or shut down the downloader at the client device, thereby saving the time and electric charge. After the offline download is completed, the user may further download the file from the server of the downloader to the client device at a higher speed.

A typical offline download may include submitting, by a client, an offline download request. The offline download request may contain a download link address of a file. The download link address may be a Hyper Text Transfer Protocol (HTTP) link, an eMule link, a Bit torrent file, Magnet protocol link or any other download link address of the file. An offline task management server, upon receiving the offline download request submitted by the client, may send the offline download request to an offline task scheduling server. The offline task scheduling server may schedule an offline download server cluster, according to the offline download request, to perform the offline download. After the offline download is completed, the downloaded file may be stored in a cloud storage server, and the completion of the download may be reported to the offline task scheduling server. The offline task scheduling server may, in turn, inform the client to get the downloaded file from the cloud storage server. Bit Torrent (BT) is a content distribution protocol, which adopts a highly efficient software distribution system and peer-to-peer technology to share files, and is typically used in case of large files. BT also provides an upload service for the user. Further, BT may allow redistributing a download process across several nodes in the network. According to the Bit Torrent protocol, an issuer may create a .torrent file, i.e. BT torrent file as the file to be issued. The BT torrent file may contain references to one or more files that would be downloaded when a user selects the BT torrent file as a download target. The BT torrent file may also contain a download source for each file referred in the BT torrent file. The download sources may be the target from which the files in the BT torrent file need to be downloaded.

However, in a traditional offline download, if a user adds a BT torrent file for download, the server may download all files corresponding to the BT torrent file completely, which may extend the download time and may occupy substantial disk space.

SUMMARY

A system for an offline download of a BT torrent file is provided for improving download efficiency.

A system for BT data offline download may include an offline download task management server adapted to receive a download task. The download task may be responsible for a subset of files in the BT torrent file obtained by a download client device. The download task may be selected by a user from offline download torrent tasks. The offline download task management server may send the download task to an offline download scheduling server. The offline download scheduling server may process the download task. Processing a download task may involve identifying and removing a part of the download task that may be repetitively downloaded. The processing may further involve combining the download task with other download tasks. The offline download scheduling server may distribute the processed download task to an offline download server The offline download server may download data according to the processed download task and store the downloaded data in a storage server The download client device may then download the downloaded data from the storage server. The downloaded data may be a part of the files corresponding to the download task selected by the user of the download client device.

In another example, the offline download scheduling server may select a file adjacent to the part of the files and add the adjacent file to the subset of files to be downloaded by the download task. The offline download scheduling server may further distribute the combination of the subset of the files and the adjacent file to the offline download server. This may be done in case size of the subset of files is less than a predetermined fragment size of a torrent file.

In yet another example, the system for offline downloading BT data may further include an offline task database to store the download task and the corresponding downloaded data. The offline download task management server may search the offline task database according to the download task and notify the download client device of the completion of the download if the downloaded data corresponding to the download task is stored into the offline task database. The download client device may then download the downloaded data from the storage server.

In another example, the system for offline downloading BT data download may further include a torrent access server to receive a query for torrent information from the download client device. The torrent access server may also store torrent information uploaded by the download client device in a torrent database.

Another example of the system for downloading offline BT data may further include a statistic server to receive statistics information relevant to the download task and error information encountered in a download process.

In addition, a method for downloading offline BT data is provided for improving download efficiency.

A method for offline downloading BT data may involve receiving one or more download tasks. Each download task may be for a subset or a part of the one or more files listed in a BT torrent file. The part of files may be selected by a user via an offline download torrent task. The method may further involve processing the download tasks. The processing of a download task may involve removing a part of the download task that will be repetitively downloaded. The processing of the download task may further involve combining the download task with other download tasks. The method may continue to a step of downloading data according to the processed download tasks and storing the downloaded data. The method may further involve further downloading the stored downloaded data to the client device or any other device of the user's choice.

After processing a download task to remove repetitive parts of the download task, the method may further determine if a size of the subset of files is less than a predetermined fragment size of a torrent file. Only downloaded data above a certain predetermined fragment size may be validated. Therefore, to ensure validation after download is complete, an additional file may be added to the subset of files. This ensures that downloaded data is at least of the predetermined fragment size and thus a validation may be performed on the downloaded data.

The method may further involve searching for the download task to determine whether data corresponding to the download task has been previously downloaded and stored. In case the data corresponding to the download task has been already downloaded an stored, the download client device may be notified that the download is complete. The download client device may then engage in downloading the stored data. In case the data corresponding to the download task has not been previously downloaded, the method may continue by processing the download task to remove a repetitive part of the download task and combine the download task with any other available download tasks.

The method may also involve querying torrent information and storing torrent information uploaded by the user.

Further, the method may involve receiving statistics information relevant to the download task and any error information encountered during the download process of the download task.

In another aspect of the system, a computer storage medium is provided for improving download efficiency.

The computer storage medium may contain computer executable instructions executable by one or more processors. By execution of the instructions, the one or more processors may perform a method for offline download of BT data. The instructions may include instructions to receive one or more download tasks. A download task may be for downloading a subset or a part of the files selected by a user from a BT torrent file. The instructions may further include instructions to process the download tasks. Processing the download task may remove a part of the download task that may be repetitively downloaded and further the download task may be combined with other download tasks. The computer storage medium may also include instructions to download data according to the processed download task and store the downloaded data. The instructions may further allow downloading the stored downloaded data corresponding to the download task to the client device.

In the above aspects of a system, method and the computer storage medium with instructions for offline download of BT data, the download task may download only a part of, or a subset of the files in an offline download torrent task or a BT torrent file, rather than all the files in the offline download torrent task or BT torrent file. This may improve download efficiency. Further, the data downloaded by the download task may correspond only to the subset of the files. Since, data corresponding to only a subset of the files is being saved, disk space may be saved. The repeated download task may be removed, thus reducing the number of the download tasks, and consequently saving bandwidth, improving the download efficiency further and saving overall network resources.

DETAILED DESCRIPTION

A method and system for offline downloading of BT data is described in conjunction with following embodiments and figures, to clarify the technical solution thereof.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

Figure 1:
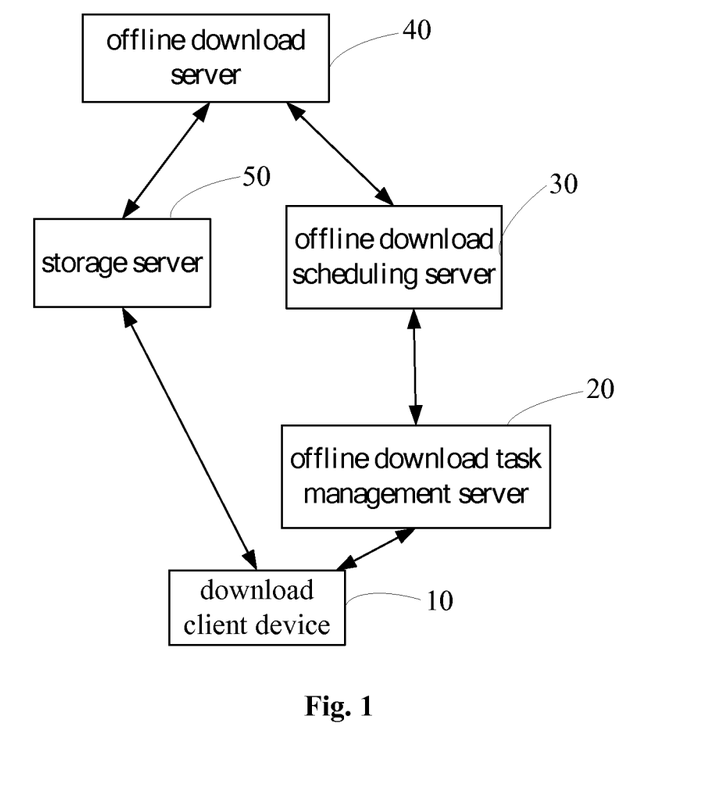
FIG. 1 is a schematic view of an internal structure of an example system for offline downloading BT data.

As shown in FIG. 1, in an embodiment, a system for offline downloading BT data, may include a download client device 10, an offline download task management server 20, an offline download scheduling server 30, an offline download server 40 and a storage server 50.

The download client device 10 may obtain a download task. The download task may be for a subset of files selected by a user from an offline download torrent task. The download client device 10 may send the download task to the offline download task management server 20. In one embodiment, the user may select all the files from the offline download torrent task as the download task. In other embodiments, the user may select any file in the subset of files to be downloaded by the download task. For example, if the download tasks in the offline download torrent task includes 20 files, user A may choose to download file 1, file 3 and file 5, and user B may choose to download file 1, file 2 and file 4. The download task for the selected subset of files may contain download link information corresponding to the selected subset.

The offline download task management server 20 may receive one or more download tasks from the download client device 10. The offline download task management server 20 may send the one or more download tasks to the offline download scheduling server 30.

In one embodiment, after receiving the one or more download tasks, the offline download server 40 may generate a unique identifier number for each independent download task. Identical download tasks may be assigned the same identifier number.

The offline download scheduling server 30 may process the one or more download tasks to remove a part of the at least one download task to be repetitively downloaded, and distribute the processed download task to the offline download server 40.

The offline download scheduling server 30 may further identify a download task that may be repeated in the one or more download tasks. For instance, the received download tasks may contain two or more download tasks to download the same subset of files. In such a case, the offline download scheduling server 30 may identify the two or more download tasks with the same subset of files. Further, the offline download scheduling server 30 may keep only one of such repeated download tasks and may remove the remaining instances of the repeated download tasks. The offline download scheduling server 30 may then distribute the processed download tasks to the offline download server 40.

In one embodiment, the offline download scheduling server 30 may record which files in the torrent file are being downloaded. Further, the offline download scheduling server 30 may identify if the user has selected a subset of files from the torrent file that is already being downloaded. This may be indicated by a record of the files in the torrent file maintained by the offline download scheduling server 30. In such a case, the user may be added to the record and the offline download scheduling server 30 may treat the user's selection as a repeated request. The download task for the repeated subset of files may not be sent to the offline download server 40, thus reducing repetition of the download tasks, saving bandwidth resources and improving download efficiency. In this way, repetitive or duplicate offline file download tasks may be filtered by the offline download scheduling server 30, and the download task for the same file may be sent to the offline download server 40 only once.

The offline download scheduling server 30 may also combine the download tasks for different subsets of the files from the same offline download torrent task. The offline download scheduling server 30 may then distribute such a combined download task with different subsets of files to the offline download server 40. In one embodiment, the offline download torrent task may include multiple files, and each file may correspond to a BitMap. The user may individually and separately select files from the multiple files for download, leading to multiple subsets of the files. The offline download scheduling server 30 may, as a result, obtain several download tasks corresponding to the BitMaps of the selected subsets of files. The offline download scheduling server 30 may combine the download tasks into one download task. This may be done by combining the several subsets of the BitMaps into one subset of files assigned to the download task, thereby reducing the number of download tasks, saving bandwidth resources and improving download efficiency.

Alternatively, or in addition, in an embodiment, the offline download scheduling server 30 may select an additional file, to add to the selected subset of files. The selected additional file may be a file listed in the offline download torrent task sequentially next to the selected subset of files. The offline download scheduling server 30 may then send the combination of the additional file and the selected subset of files to the offline download server 40 for download. The offline download scheduling server 30 may engage in such combination in case the size of the selected subset of files is less than a predetermined fragment size. Such a combination may guarantee that the subset of the files selected by the user is downloaded and further a hash check may be performed for the downloaded files. Thus, by selecting the additional file and combining the additional file and the selected subset of files, the offline download scheduling server 30 may ensure validity of the download.

The offline download server 40 may include multiple nodes. A download task may be scheduled to download the corresponding data on any one or more of these nodes. The offline download scheduling server 30 may receive load information of the nodes in the offline download server 40. The load information may be reported by the nodes of the offline download server 40 directly or alternatively, by the offline download server 40. Based on the received load information, the offline download scheduling server 30 may schedule dynamically the download task for the selected subset of files to a particular node of the offline download server 40 to perform the download task.

In addition, or alternatively, the offline download scheduling server 30 may delete a download task. For example, the offline download scheduling server 30 may identify download tasks with progress in a suspended state or at a standstill for a long time, compared to a predetermined threshold. The offline download scheduling server 30 may delete such download tasks. The offline download scheduling server 30 may synchronize information of a failed download with the offline download task management server 20, and the offline download task management server 20 may notify the download client device 10 of the information of the failed download.

The offline download server 40 may download data according to the processed download tasks. Thus, the download server 40 may download the selected subset of files and store the downloaded data in the storage server 50.

In addition, or alternatively, in an embodiment, the offline download server 40 may report download speed information to the offline download scheduling server 30. The offline download server 40 may also register its address into the offline download scheduling server 30 and report the load information of the nodes in the offline download server 40. The offline download scheduling server 30 may schedule the download tasks dynamically and evenly according to the reported load information.

The download client device 10 may download, from the storage server 50, the downloaded data of the subset of the files which is selected by the user of the download client device 10. The download client device 10 may download the downloaded data from the storage server 50 upon receiving the notification of completion of the download task from the offline download task management server 20. Alternatively, or in addition, the download client device 10 may query the offline download task management server 20 of the progress of the download task. The download client device 10 may download the downloaded data from the storage server 50 upon receiving a response to its query indicating the completion of the download. The offline download task management server 20 may notify the user that the offline download is completed. The storage server 50 may store the downloaded data for later download by the download client device 10. The download client device 10 may query the offline download task management server 20 to obtain the download progress. The download client device 10 may also request the offline download task management server 20 to validate the downloaded data. The downloaded data may be downloaded according to the predetermined fragment size. The predetermined fragment size may be on which a hash check may be performed as part of validation of the downloaded data. A downloaded data fragment failing the hash check may indicate an error and may be downloaded again.

In addition, the offline download task management server 20 may provide an entry address of the downloaded data for the download client device 10. The download client device 10 may download the downloaded data from the storage server 50 via the entry address.

Figure 2:
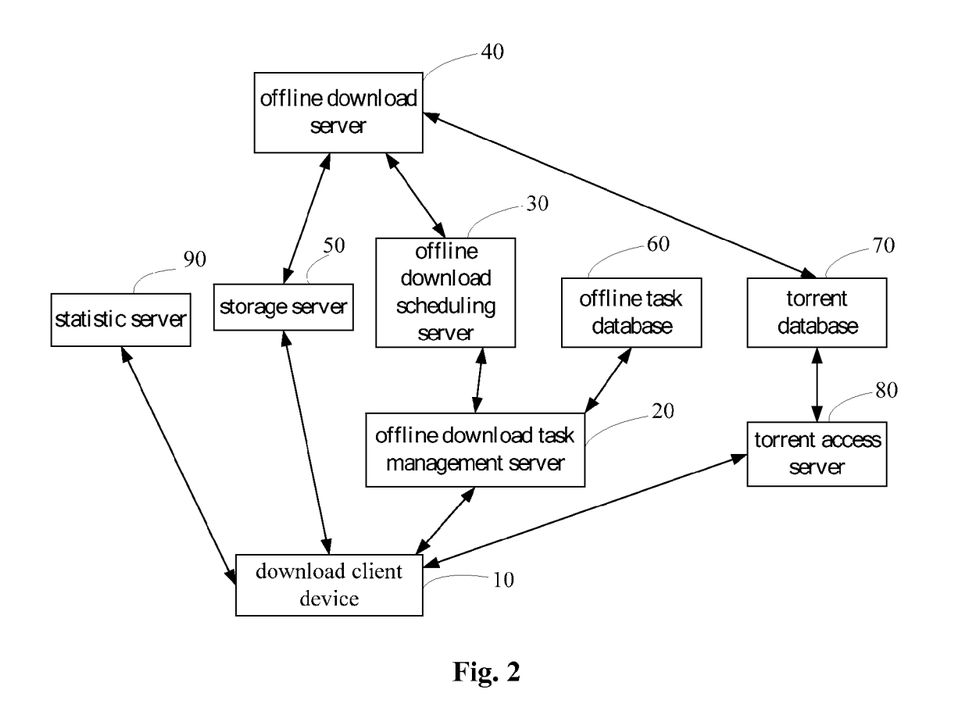
FIG. 2 is a schematic view of an internal structure of an example system for offline downloading BT data.

In addition, or alternatively, in an embodiment, as shown in FIG. 2, a system for offline downloading BT data may include an offline task database 60, a torrent database 70, a torrent access server 80 and a statistic server 90, besides the download client device 10, the offline download task management server 20, the offline download scheduling server 30, the offline download server 40 and the storage server 50.

The offline task database 60 may store the download task for the selected subset of files and the corresponding downloaded data. The offline task database 60 may synchronize the downloaded data with the storage server 50 and record the synchronization result.

The offline download task management server 20 may determine whether the downloaded data in the offline task database 60 corresponds to a download task of a selected subset of files. In case the downloaded data in the offline task database 60 corresponds to the download task, the offline download task management server 20 may notify the download client device 10 that the offline download has been completed. The download client device 10 may then download the downloaded data directly from the storage server 50. In case the downloaded data in the offline task database 60 does not correspond to the download task, the offline download task management server 20 may send the download task to the offline download scheduling server 30 for further processing.

The torrent database 70 may store torrent information which contains the link address of the files to be downloaded.

The offline download server 40 may obtain corresponding torrent information of the files to be downloaded by the download task from the torrent database 70. The torrent database 70 may have the corresponding torrent information in case the data for the files to be downloaded by the download task is previously downloaded by a previously processed download task such as a BT file download task. The torrent information may contain the link address and other information for downloading a file. If the download task for the selected subset of files is a download task of HTTP, eMule or Magnet protocol, the offline download server 40 may obtain the corresponding link information from the offline task database 60. The link information may contain the link address for downloading the file. For the same offline file download task from different clients, the clients may share download progress information thereof.

In addition, or alternatively, the offline download server 40 may generate a file hash value for the downloaded data. The offline download server 40 may write the calculated file hash value into the offline task database 60. The offline download server 40 may further report progress information and speed information of offline downloads to the offline download scheduling server 30.

The offline download scheduling server 30 may synchronize the received progress information of the download with the offline download task management server 20.

The torrent access server 80 may receive a torrent information query sent by the download client device 10. The torrent access server 80 may also store torrent information uploaded by the download client device 10 into the torrent database 70. In one embodiment, the torrent information published by the user may be uploaded to the torrent access server 80 by the download client device 10, and the torrent database 70 may store the torrent information. The torrent access server 80 may provide access for downloading the torrent file by the download client device 10.

The statistic server 90 may receive relevant information about the download tasks uploaded by the download client device 10. The statistic server 90 may also receive and store error information related to the download process of the download tasks. The relevant information about a download task may include download time, download speed, download result, data size, and original download link as well as the download speed and download time for different Uniform/Universal Resource Locator (URL), and other such information. The error information related to the download process may refer to information such as, whether any invalid hash values were encountered during the download.

In another embodiment, the system for downloading BT data offline may include a backend server, a tracker server and a resource index server. The backend server may analyze and process the error information reported by the statistic server 90. The tracker server may receive a periodic online status report from the download client device 10. The tracking server may also receive local resource information from the nodes of the offline download server 40. The tracker server may provide a service to the download client device 10 for querying the information related to the node of the offline download server 40 responsible for the download. The resource index server may provide a service to the download client device 10 for querying a multi-resource link address set so that the download client device 10 may download data according to the link address set.

Figure 3:
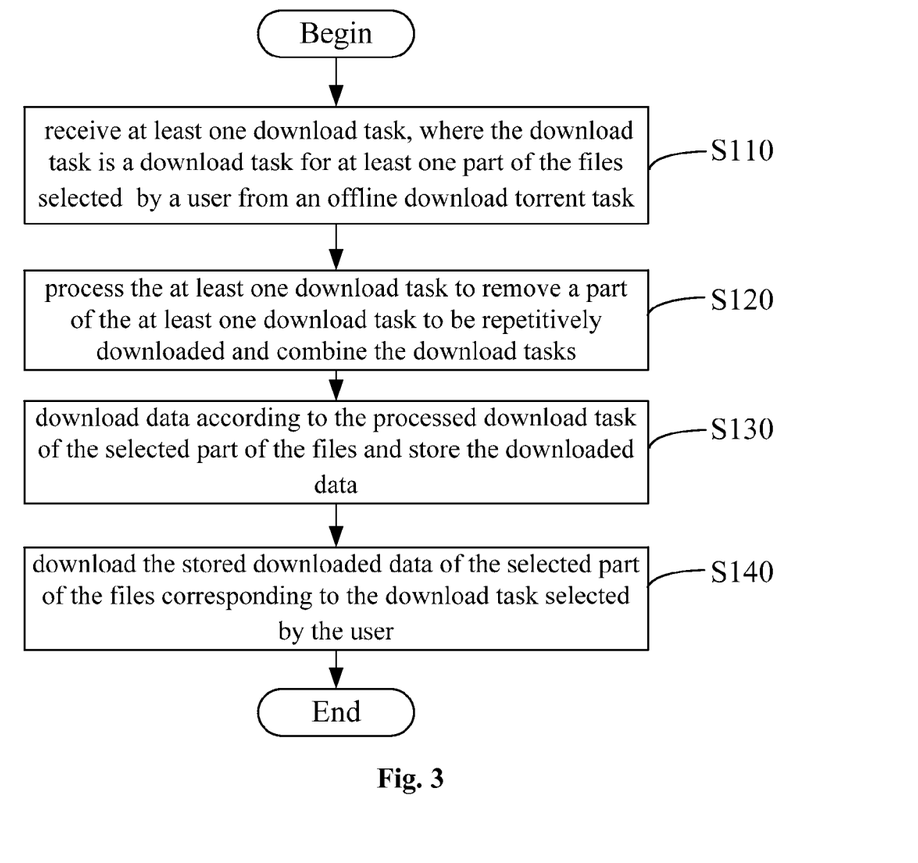
FIG. 3 is a flowchart of a method for offline downloading BT data according to an embodiment.

In an embodiment, as shown in FIG. 3, a method for downloading BT data offline may include at least the following steps.

In Step S110, one or more download tasks may be received, where the download task is for a subset of the files selected by a user from an offline download torrent task.

Figure 5:
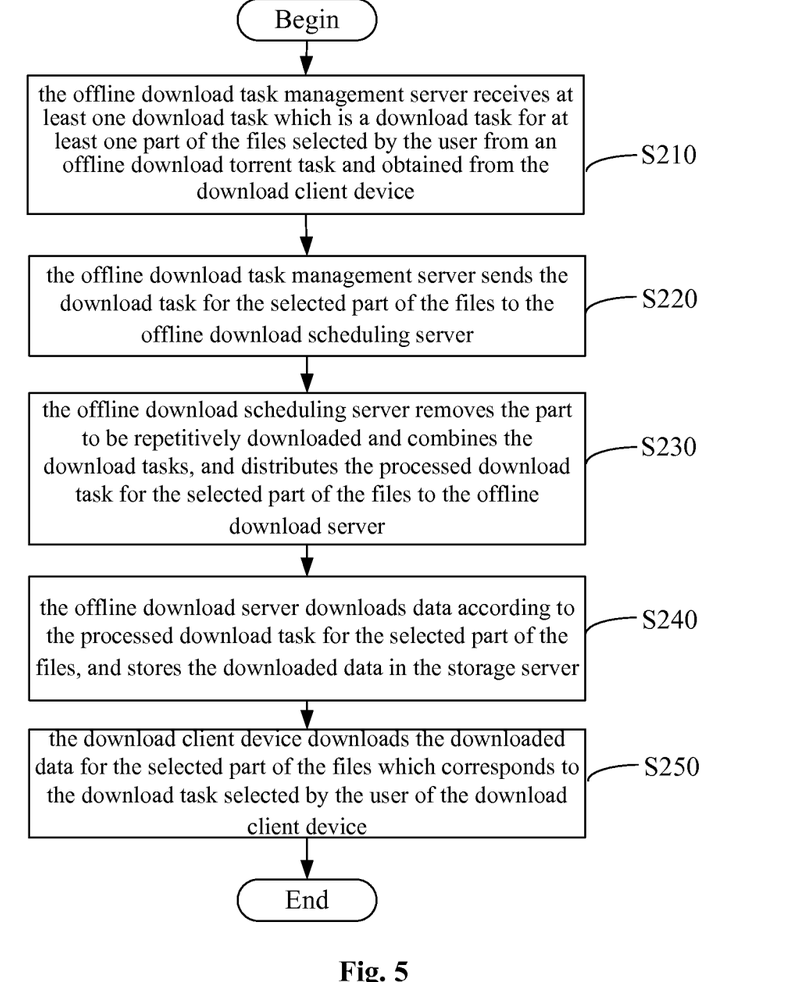
FIG. 5 is a flowchart of an example method for offline downloading BT data.

As described in S210 shown in FIG. 5, an offline download task management server 20 may receive the download tasks from download client devices such as the download client device 10.

The user may select any combination of files from the offline download torrent task as a subset of files for the download task. For example, if an offline download torrent task includes 20 files, a user A may choose to download file 1, file 3 and file 5, and a user B may choose to download file 1, file 2 and file 4. The offline download task management server 20 may receive the download task for the selected subset of files. The download task for the selected subset of files may carry the link address for downloading the files.

In FIG. 5, after Step S210, the method may include Step S220. In Step S220, the offline download task management server 20 may send a download task to the offline download scheduling server 30.

After receiving the at least one download task, the offline download task management server 20 may generate a unique identifier number for each independent download task. The offline download task management server 20 may assign the same identifier number to download tasks deemed to be the same. For instance two download tasks may be deemed to be the same, if both tasks are configured to download the same subset of files. Moreover, the offline download task management server 20 may write the download task into the offline task database 60.

Figure 4:
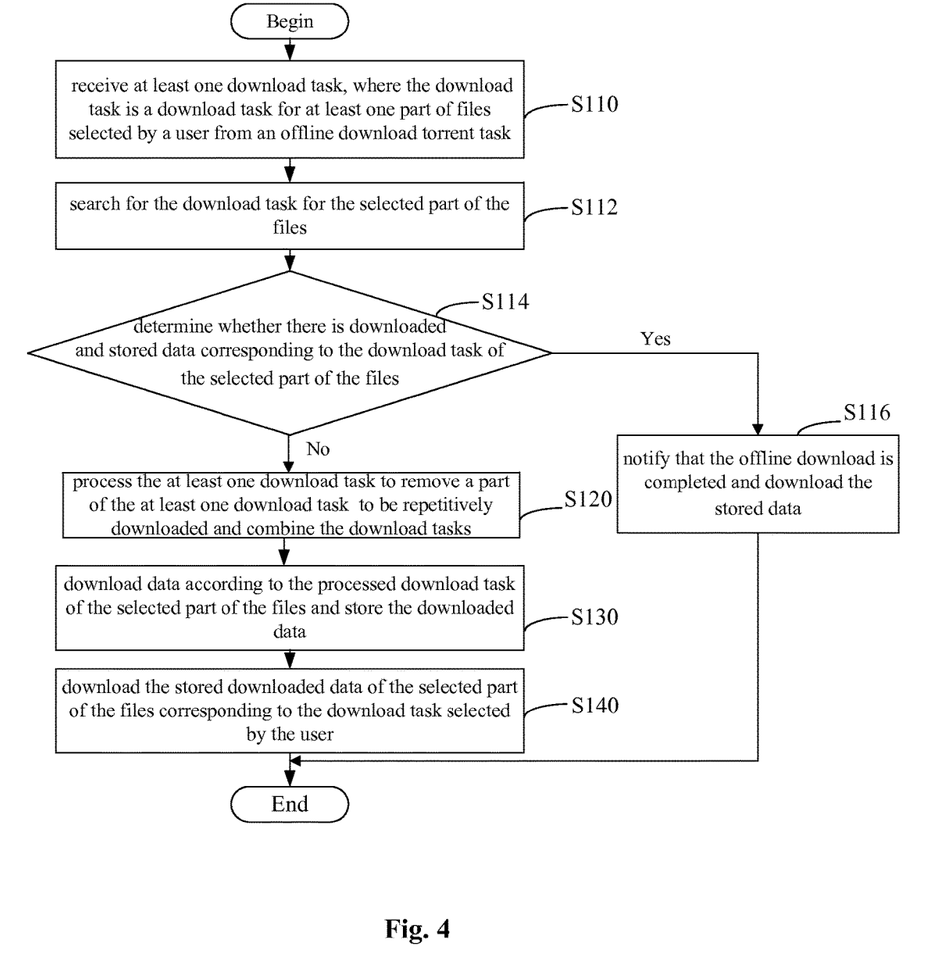
FIG. 4 is a flowchart of a method for offline downloading BT data according to another embodiment.

In another embodiment, shown in FIG. 4, after Step S110, the method may include step S112.

In Step S112, the download task of the selected subset of files may be searched.

Figure 6:
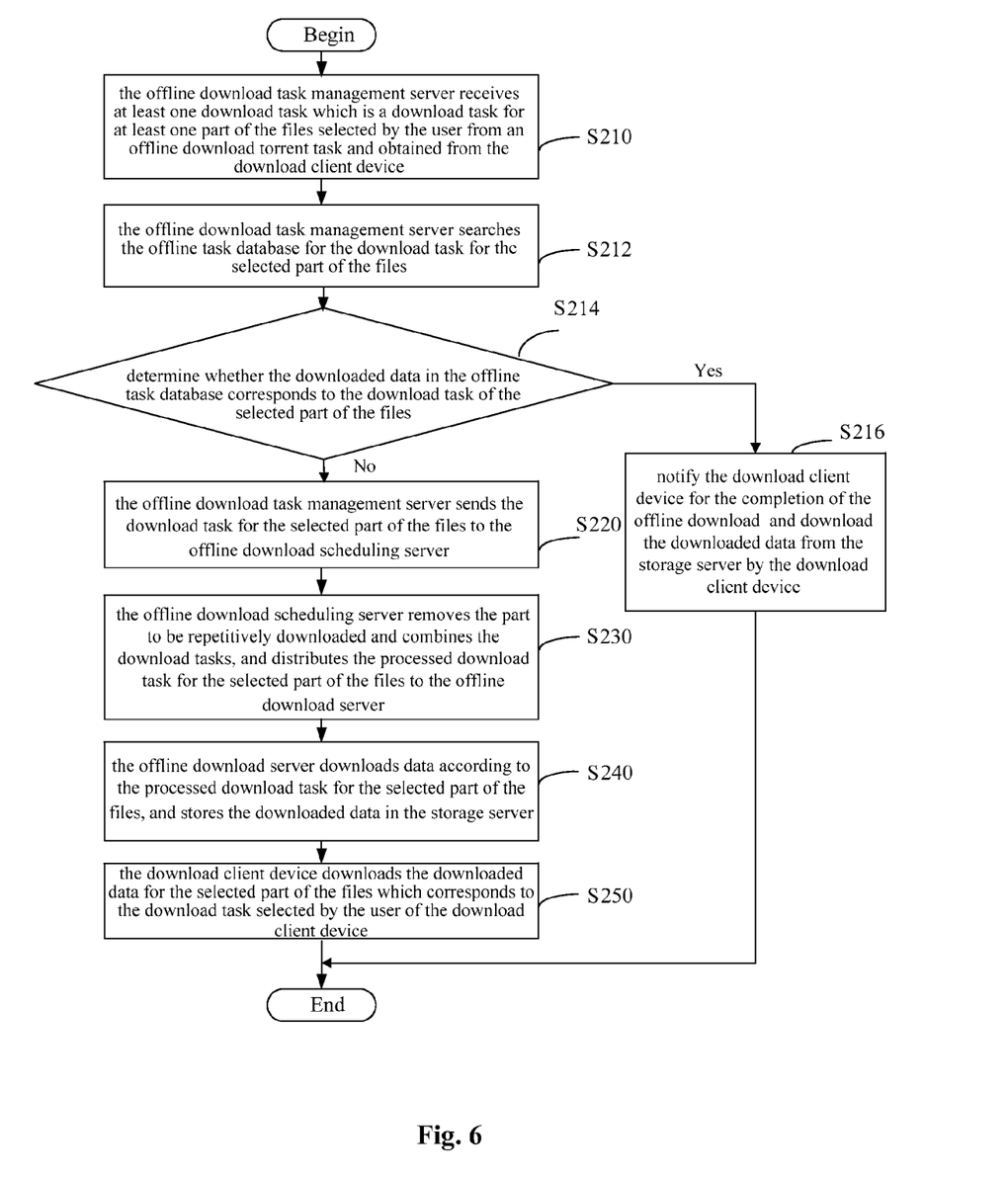
FIG. 6 is a specific flowchart of another example method for offline downloading BT data shown in FIG. 4.

As described in step S212 shown in FIG. 6, the offline download task management server 20 may search the offline task database 60 for the download task.

The offline download task management server 20 may search the offline task database 60 for a download record. The offline task database 60 may store an association between the download task and the downloaded data in the download record.

In Step S114, it may be determined whether data corresponding to the selected subset of files of the download task has been previously downloaded and stored, and if so, Step S116, may be performed, else, Step S120 may be performed.

Further, as described in Step S214 in FIG. 6, the offline download task management server 20 may determine whether the data corresponding to the subset of files of the download task has been stored in the offline task database 60. In case the offline task database 60 contains the data corresponding to the subset of files of the download task, Step S216 may be performed, else step S220 may be performed. The step S216 may include notifying the download client device 10 that the offline download is complete and further, fetching by the download client device 10 the downloaded data from the storage server 50. In step S220 the offline download task management server 20 may send the download task to the offline download server 40. Thus, if the downloaded data corresponding to the download task is found, i.e. the offline task database 60 and the storage server 50 already contain the data of the subset of the files selected by the user, the offline download task management server 20 may notify the download client device 10 that the offline download is completed. The download client device 10 may, in response, download the previously downloaded data from the storage server 50 directly. Step S116 of FIG. 6 illustrates the notification of the completion and the consequent download of the stored data.

Further, the download client device 10 may be notified that the offline download is completed and the download client device 10 may download the data required by the user from the storage server 50.

In Step S120, a download task may be processed. This may include determining whether the download task is a duplicate. A download task may be deemed duplicate if a subset of files is requested to be downloaded repetitively by multiple download tasks. In case of such duplicate download tasks, only one download task with that subset of files may be actually worked on and the rest of the duplicate download tasks may be removed. Further, in step S120, some download tasks may be combined.

As described in S230 shown in FIG. 5, the offline download scheduling server 30 may remove the duplicate download tasks and combine some download tasks. The offline download scheduling server 30 may be responsible to distribute the processed download task to the offline download server 40.

The offline download scheduling server 30 may record which files in the BT torrent file are being downloaded. Some files in BT torrent file that are selected by the user may already be in the process of being downloaded. Such files may be indicated in the record for the torrent file. In such a case, the user may be added to the record, and the download task may be deemed as a repetitive or duplicate download task. Thus, the download task may not be sent to the offline download server 40, consequently reducing the repetitive download task, saving bandwidth resources and improving download efficiency. That is to say, identical download tasks may be filtered by the offline download scheduling server 30, or that a download task may be sent to the offline download server 40 only once.

Further, the offline download scheduling server 30 may combine the download tasks for different selected subsets of the files that are part of a particular offline download torrent task. The offline download scheduling server 30 may also distribute the combined download task to the offline download server 40. In one embodiment, the offline download torrent task may include multiple files, and each file may correspond to a BitMap. The user may select files from the download torrent task in several batches, thus creating several corresponding download tasks. The offline download scheduling server 30 may receive the several download tasks associated with the subsets of files from the multiple files. The offline download scheduling server 30 may combine the download tasks into one. The Bitmaps may be downloaded as one download task, thus reducing the number of download tasks, saving bandwidth sources and improving download efficiency.

In a further embodiment, after repetitive parts are removed from the download task and some download tasks are combined, the method may continue to selecting, by the offline download scheduling server 30, a file in addition to the selected subset of files. Further steps may involve combining the additional file and the selected subset of files, and sending the combined set of files to the offline download server 40 as a list of files to be downloaded by the download task. The offline download scheduling server 30 may engage in such combination of files in case the size of the selected subset of files is less than a predetermined fragment size. Meeting the predetermined fragment size may enable a validation of the downloaded data, such as a hash check, to be performed once the subset of the files selected by the user are downloaded. Thus, by selecting the additional file and combining the additional file and the selected subset of files, may ensure validity of the download by meeting the threshold size for performing the hash check for validation. The additional file may be a file from the offline download torrent task other than those in the selected subset. Further, the additional file may be sequentially adjacent to the selected subset of files.

In Step S130, data may be downloaded according to the processed download task for the selected subset of files and the downloaded data may be stored.

As described in Step S240 in FIG. 5, the offline download server 40 may download the data according to the processed download task, and store the downloaded data in the storage server 50.

If the download task is a BT file download task, the offline download server 40 may read the corresponding torrent information from the torrent database 70. The corresponding torrent information may contain the link address for the files to be downloaded and other information. If the download task is for HTTP, eMule or Magnet protocol, the offline download server 40 may obtain the corresponding link information form the offline task database 60 which may contain the link address for the files to be downloaded. The offline download server 40 may receive download tasks from multiple users. If the download tasks provided by the different users correspond to particular offline file or files, the users may share the download progress information of the particular offline file or files.

Moreover, the method may further include storing, by the offline download server 40, the downloaded data into the offline task database 60, and synchronizing the data to the storage server 50 and recording the synchronization result.

In a further embodiment, the offline download server 40 may report the progress information of the download task to the offline download scheduling server 30. The method may include steps of reporting, by the offline download server 40, the progress information and speed information of the download. The report may be sent to the offline download scheduling server 30. The offline download server 40 may further be responsible for generating a hash value for the downloaded data and writing the hash value into the offline task database 60 for use during validation.

After Step S130, the method may further include steps of synchronizing the received progress information of the download task with the offline download task management server 20. Such synchronization may be performed by the offline download scheduling server 30.

In Step S140, the stored downloaded data of the file or files corresponding to the download task selected by the user may be downloaded.

As described in Step S250 in FIG. 5, the download client device 10 may download or fetch the downloaded data from the storage server 50. Thus, the download client device 10 receives the downloaded data of the selected subset of files corresponding to the download task selected by the user of the download client device 10.

The download client device 10 may initiate the download from the storage server 50 upon receipt of notification of completing the offline download sent by the offline download task management server 20. The download client device 10 may download the downloaded data from the storage server 50. In addition, the download client device 10 may query the progress of the download task from the offline download task management server 20. If the download task is completed, the download client device 10 may download the downloaded data from the storage server 50. The offline download task management server 20 may notify the user that the offline download is completed by email, text message or any other form of notification as may be chosen by the user.

The method for offline downloading BT data may further include querying the progress information of the download task from the offline download task management server 20. The download client device 10 may query the offline download task management server 20 for such progress information. The method may further include checking and/or validating the downloaded data. The downloaded data may be downloaded according to the predetermined fragment size. Thus, the hash check may be performed for the downloaded data fragments with the predetermined fragment size. Any data fragment with invalid hash value may be downloaded again. Moreover, the offline download task management server 20 may provide an access address for downloading the downloaded data to the download client device 10. The download client device 10 may download the downloaded data from the storage server 50 according to the access address.

In addition, or alternatively, the method for offline downloading BT data may include deleting a download task if progress of the download task has been suspended or has been at a standstill for a long time. The time the download task has not progressed may be compared to a predetermined threshold. Information of such failed download tasks may be synchronized between the offline download task management server 20 and the offline download scheduling server 30. Further, the information of the failed download tasks may be sent to the download client device 10 by the offline download task management server 20.

In a further embodiment, the method for offline downloading BT data may further include querying for torrent information, and storing torrent information uploaded by the user.

A torrent access server 80 may be provided to receive a query for torrent information from the download client device 10. The torrent access server 80 may also store torrent information uploaded by the download client device 10 to the torrent database 70. The torrent information published by the user may be uploaded to the torrent access server 80 by the download client device 10, and the torrent database 70 may store the torrent information. The torrent access server 80 may provide a download access of the torrent file for the download client device 10.

In a further embodiment, the method for offline downloading BT data may include receiving statistical information related to the download task. Information about errors during the download process may also be received.

A statistic server 90 may receive the statistics information relevant to the download task. The statistic server 90 may also receive the error information encountered during the download process. The relevant statistics information of the download task may include download time, download speed, download result, data size, and the original download link, as well as the download speed and download time for different URLs and any other such data. The error information may refer to information such as invalid hash values encountered during the download.

In a further embodiment, the method for offline downloading BT data may further include providing a backend server, a tracker server and/or a resource index server. The backend server may analyze and process the error information reported by the statistic server 90. The tracker server may receive periodic online status reported by the download client device 10. The tracker server may also receive local resource information from the nodes of the offline download server 40. The tracker server may, thus, provide a service via which the download client device 10 may query download node information. The resource index server may provide a service for the download client device 10 to query a multi-resource link address set, such that the download client device 10 may download data according to the link address set.

In addition, or alternatively, one or more computer storage medium containing computer executable instructions may be provided. The computer executable instructions may enable one or more processors to offline download BT data. The offline downloading of the BT data performed by the one or more processors via the executable instructions in the computer storage medium may include the steps substantially similar to the embodiments described above.

In the system and method for offline downloading BT data, and the computer storage medium, rather than downloading all the files in the offline download torrent task, a subset or a part of the files selected by a user in the offline download torrent task may be downloaded, thereby improving download efficiency. Further, the downloaded data corresponding to the download task may contain data only for the selected subset or part of the files and not all the files in the offline download torrent task. Thus by storing the downloaded data corresponding only to the selected subset of files, disk space may also be saved. The repeated or duplicate part is removed from the download task and some download tasks may be combined, thus reducing the number of download tasks, saving bandwidth resources, improving download efficiency further, and saving network resources.

In addition, a download proxy server may be adopted to combine the different download tasks as one offline download torrent task, further reducing the number of download tasks, saving the bandwidth resources, and improving the download efficiency. In case the size of the selected part of the files is less than a predetermined fragment size, the download proxy server may select a file adjacent to the selected part of the files and combine the selected part of the files and the adjacent file as a list of files associated with the download task. The download proxy server may then distribute the combination of the selected part of the files and the adjacent file to the offline download server, thus ensuring performance of a hash check for the selected part of the files. The hash check may improve the validity of download. In case previously downloaded data in an offline task database corresponds to the selected part of the files of the download task, the downloaded data may be downloaded directly from a cloud storage server, thereby saving network resources. A torrent access server may be provided to enable the user to upload torrent information and query the torrent information available on the torrent access server. A statistic server may be provided to record the relevant statistics information and error information of the download task. Such statistics and error information may be accessible for analyzing the relevant information and error information.

The foregoing detailed description has described only a few of the many possible implementations of the present disclosure. For this reason, this description of example embodiments is intended by way of illustration, and not by way of limitation. The methods, devices, and logic described above may be implemented in many different ways in many different combinations of hardware, software or both hardware and software.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The invention claimed is:

1. A system for offline downloading BitTorrent (BT) data, comprising:
   an offline download task management server adapted to receive at least one download task from a download client device, wherein a download task corresponds to a subset of files selected by a user;
   the offline download task management server further adapted to send the at least one download task to an offline download scheduling server;
   the offline download scheduling server adapted to process the at least one download task comprising the identification and removal of any duplicate download task from the at least one download task and further combining remaining of the at least one download task into a processed download task;
   the offline download scheduling server further adapted to distribute the processed download task to an offline download server;
   the offline download scheduling server further adapted to select an additional file to combine with the subset of files, and combine a download task of the additional file into the processed download task, if a size of the subset of files is less than a predetermined fragment size of a torrent file;
   the offline download server adapted to download data according to the processed download task, the downloaded data comprising the subset of files associated with the processed download task, and the offline download server being further configured to store the downloaded data in a storage server; and
   the download client device adapted to download, from the storage server, the stored downloaded data corresponding to the subset of files of the at least one download task, perform a hash check for the data downloaded by the download client device, and re-download the stored downloaded data corresponding to the subset of files of the at least one download task from the storage server if a hash value of the data downloaded by the download client device is invalid, wherein the hash value of the data downloaded by the download client device is invalid if the size of the data downloaded by the download client device is less than the predetermined fragment size of the torrent file.

2. The system for offline downloading BT data according to claim 1, the system further comprising:
   an offline task database adapted to store the at least one download task and the downloaded data; and
   the offline download task management server further adapted to search the offline task database for the download task, and notify the download client device of a completion of the download task in response to the downloaded data corresponding to the download task being stored into the offline task database.

3. The system for offline downloading BT data according to claim 1, the system further comprising a torrent access server adapted to receive a query for torrent information from the download client device and further adapted to store the torrent information uploaded by the download client device in a torrent database.

4. The system for offline downloading BT data according to claim 1, the system further comprising a statistic server adapted to receive performance information associated with the at least one download task and further adapted to receive error information associated with download process of the at least one download task.

5. The system for offline downloading BT data according to claim 4, further comprising
   a backend server adapted to analyze the error information received by the statistic server;
   a tracker server adapted to receive a periodic online status report from the download client device and local resource information from the offline download server to respond to a query about download node information from the download client device;
   a resource index server adapted to respond to a query about a multi-resource link address set from the download client device, wherein the download client device may download data according to the multi-resource link address set.

6. The system for offline downloading BT data according to claim 1, wherein the offline download scheduling server is further adapted to receive load information reported by the offline download server and the offline download scheduling server further adapted to schedule dynamically the at least one download task to be performed at particular offline download server nodes according to the load information from the offline download server.

7. The system for offline downloading BT data according to claim 1, wherein the offline download server is further adapted to synchronize information of a failed download with the offline download server; and
the offline download task management server is adapted to notify the download client device of the information of the failed download.

8. A method for offline downloading BT data, comprising:
receiving, by an offline download system, at least one download task, wherein a download task is responsible for download of a subset of files selected by a user from an offline download torrent task;
processing, by the offline download system, the at least one download task to remove a duplicate download task and combining the at least one download tasks into a processed download task;
selecting, by the offline download system, an additional file from the offline download torrent task in addition to the subset of files, and combining, by the offline download system, a download task of the additional file into the processed download task, in case a size of the subset of files is less than a predetermined fragment size of a torrent file;
downloading, by the offline download system, data according to the processed download task and storing the downloaded data
downloading, by a client device, the stored downloaded data corresponding to the at least one download task from the offline download system; and
performing, by the client device, a hash check for the data downloaded by the download client device, and re-downloading, by the client device, the stored downloaded data corresponding to the subset of files of the at least one download task from the storage server if a hash value of the data downloaded by the download client is invalid, wherein the hash value of the data downloaded by the download client device is invalid if the size of the data downloaded by the download client device is less than the predetermined fragment size of the torrent file.

9. The method for offline downloading BT data according to claim 8, further comprising:
determining if data corresponding to a first download task from the at least one download task is previously downloaded and stored by searching for the first download task; in response to the data corresponding to the first download task being found, notifying the download client device of the completion of the first download task; and
in response to absence of the data corresponding to the first download task being found, processing the first download task.

10. The method for offline downloading BT data according to claim 8, further comprising responding to a query of torrent information and storing the torrent information uploaded by a user.

11. The method for offline downloading BT data according to claim 8, further comprising receiving relevant information of the at least one download task comprising performance information and error information.

12. The method for offline downloading BT data according to claim 8, further comprising receiving load information indicating processing time at one or more nodes of an offline download server and dynamically scheduling the at least one download task according to the load information.

13. The method for offline downloading BT data according to claim 8, further comprising synchronizing information of a failed download task with an offline download server and notifying the download client device of the failed download task.

14. The method for offline downloading BT data according to claim 8, further comprising:
querying information of a download process; and
checking the downloaded data.

15. A non-transitory computer storage medium containing computer executable instructions executable by one or more processors, the non-transitory computer storage medium comprising:
instructions to receive one or more download tasks, wherein a download task is corresponds to a subset of files selected by a user from a torrent task;
instructions to process the one or more download tasks to remove a duplicate download task and combining the remaining one or more download tasks into a processed download task corresponding to the subset of files associated with the received one or more download tasks;
instructions to select an additional file from the torrent task in addition to a subset of files, and combine a download task of the additional file into the processed download task, if a size of the subset of files is less than a predetermined fragment size of a torrent file;
instructions to download data corresponding to the processed download task and storing the downloaded data
instructions to download the stored downloaded data at a download client device of the user; and
instructions to perform, at the client device, a hash check for the data downloaded at the download client device, and re-download, at the client device, the stored downloaded data if a hash value of the data downloaded at the download client is invalid, wherein the hash value of the data downloaded at the download client device is invalid if the size of the data downloaded at the download client device is less than the predetermined fragment size of the torrent file.

16. The non-transitory computer storage medium according to claim 15, further comprising:
instructions to search for a first download task of the one or more received download tasks to determinate whether data corresponding to the first download task was already downloaded;
instructions to notify the download client device of completion of the first download task in response to finding downloaded and stored data corresponding to the first download task.

17. The non-transitory computer storage medium according to claim 15, further comprising instructions to respond to a query of torrent information and
instructions to store torrent information uploaded by the user.

* * * * *